Patented Oct. 7, 1941

2,258,297

UNITED STATES PATENT OFFICE 2,258,297

ORGANO-METALLIC DIESEL FUEL IGNITION PROMOTERS

Pharis Miller, Des Moines, Iowa, and Gould H. Cloud, Elizabeth, N. J., assignors to Standard Oil Development Company, a corporation of Delaware No Drawing. Application July 23, 1938, Serial No. 221,015

3 Claims. (Cl. 44—9)

This invention relates to improvements in compression ignition engine fuels and particularly to novel ignition promoters for adapting fuel oils for more efficient use in high speed Diesel type engines.

The most important requirement of a fuel for compression ignition engines is a good ignition quality such as obtained in highly paraffinic gas oils which frequently have too high cloud and pour points to be suitable for all types of service and are relatively expensive and limited in supply. Cheaper oils available for fuel purposes and which, in general, have low cloud and pour points contain considerable amounts of non-paraffinic hydrocarbons which degrade them with respect to ignition qualities. These and other considerations indicate a need for addition agents to supply fuel oils with better ignition qualities at low costs and without adding detrimental effects such as corrosiveness, lowering of flash point, etc.

An object of this invention is to provide certain classes of organo-metallic compounds which are suitably effective for promoting ignition properties of fuels, and which as addition agents adapt the fuels for more efficient use in compression-ignition engines. The metallo-organic compounds which are suitably soluble in hydrocarbon fuels are those compounds which contain a metallic element linked to an organic radical containing hydrogen and carbon. Experimental studies have shown that most organo-metallic compounds are ineffective or harmful for this purpose when used as addition agents in Diesel fuel. For example, tetraethyl lead, diethyl selenide, nickel carbonyl, and iron carbonyl are harmful addition agents for Diesel fuels. But further investigations have revealed that metals of a certain grouping are very active for promoting ignition and can be used satisfactorily when combined in appropriate oil-soluble compounds.

Tests have shown that the most active metals for promoting ignition are, in general, the heavier metals with multiple valence numbers, and these include the following: barium, mercury, antimony, and bismuth. Metals which indicate some activity but which are less active than those mentioned are strontium, zinc, arsenic, etc. The activity of a metal is judged by the ignition promoting effectiveness of compounds containing the metal, the number and the diversity of these compounds. Statistics on the performance of a large number of compounds have accordingly been found to indicate that metals with higher atomic numbers, which appear in second and fifth groups of Mendeleef's Periodic System are characteristically active, the activity increasing somewhat with the atomic number. The properties of the organic radical in the organo-metallic compound is also a factor in the effectiveness of each individual compound, since the solubility of the compound in liquid hydrocarbons depends largely upon the organic radical, and the organic radical may contain supplementing active groups.

Organic radicals combined with the metals are principally those which impart oil-solubility to the compound, and the types of compounds which have been subject to investigation are given in the following abbreviated list: fatty acid soaps and salts, such as, oleates, stearates, and oxyacetates; naphthenates; sulfonates; acetylides, simple and poly; diazotates; isodiazotates; alkyls; aryls; xanthates, particularly those with long carbon chains; carbamates; salts of thiolic acid; thionic acid; and thion-thiolic acids, salts of sulfinic acids, metal ketyls, metal benzyls, aryl stearates; alkylated aryl mono-carboxylates; alkyl thioxy carboxylates, such as amyl thioxy acetates; acyl carboxylates; resinates; metallic soaps from oxidized wax; nitrosyls; carbonyls; and others which will be later referred to. This list could be extended considerably, but for the sake of brevity has been condensed.

From comparative studies it has been learned that the organo-metallic compounds, which have particularly favorable properties of solubility in hydrocarbon oils, stability in storage, and general effectiveness as ignition promoters, are true organic compounds, such as metal alkyls including those in which the alkyl groups are partially substituted by an inorganic radical such as a nitrate, halide, etc. In general, the metal alkyls are better than metal aryls. Other suitable oil-soluble compounds contain the metal combined with an organic radical having carbon and hydrogen constituents, e. g. oleates, amine sulfonates, and carbamates.

The method used for determining the efficiencies of the various organo-metallic compounds in accelerating ignition of fuels is the one described in the S. A. E. Journal of June, 1936, page 225. This method consists in comparing the performance of a fuel to be tested with the performance of cetane blended with alpha-methyl-naphthalene. The percentage of cetane in a blend with alpha-methyl-naphthalene giving the same ignition quality test performance as the fuel in question is taken as the "cetane number" of that fuel. The evaluation by cetane numbers has been recommended by the S. A. E. Group for Compression-Ignition Fuel Research. In this method, normal cetane serves as a standard of high ignition quality in Diesel fuel rating analogously to the manner in which iso-octane acts as the standard of high anti-knock value in gasoline rating. Normal cetane has a short ignition lag when burned in a compression-ignition engine, whereas alphamethyl naphthalene on the contrary has a long ignition lag, and for a blend of these two hydrocarbons the ignition quality in terms of ignition lag is nearly inversely proportional to the concentration by volume of the cetane. The time which passes between the beginning of the fuel injection into the combustion chamber of the test engine and the point at which ignition of the fuel sets in, is called the ignition lag. The ignition lag may be expressed in time units or in degrees of crank angle, but for purposes of comparison it is denoted by the cetane number, a unit increase in cetane number being equivalent to a certain shortening in time lag, a unit decrease (negative increase) in cetane number being equivalent to a certain lengthening in time lag.

For investigating the performance of the organo-metallic compounds in changing the ignition qualities of fuels, engine tests were made on a reference fuel and samples consisting of the reference fuel blended with various organo-metallic and organic salt compounds to determine their cetane numbers, and the change in cetane number caused by the added organo-metallic compounds.

Results exemplified in the following table are indicative of the order in which the metals combined in organo-metallic and organic salt compounds are active for promoting ignition.

*Organo compounds of Group II metals*

| Organic salt compound | Percent of organic salt compound in fuel | Cetane No. increase |
| --- | --- | --- |
| Magnesium oleate | Less than 1 | −1 |
| Calcium oleate | do | 0 |
| Barium oleate | do | +4 |

Another specific compound in which barium shows a still higher activity over lighter metals in Group II and other metals in other groups is barium diphenyl amine sulfonate:

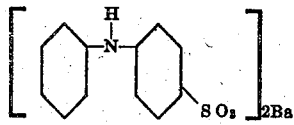

The effectiveness of this compound is demonstrated in the following table.

| Compound blended with a 40 cetane gas oil | Percent of compound in the blend | Cetane No. increase |
| --- | --- | --- |
| Barium diphenyl amine sulfonate | 0.5 | +4 |
| Do | 0.5 to 1 | +5 |

The activity and solubility of these oleate and diphenyl amine sulfonate types of compounds is of unusual interest because, before these investigations, it was doubtful that enough of such compounds of barium could be placed into solution to obtain any effect. From a large number of observations it was found that in general the order of activity for metals in Group II may be represented by:

Hg > Ba > Sr > Zn, Ca, etc.

Compounds in which mercury has been found superior in activity to most other metals are the alkyl metal compounds. A general idea of how the activities of the metals vary can be obtained from the following table, showing a comparison of metal alkyls.

| Organo-metallic compound | Percent of organo-metallic compound in fuel | Cetane No. increase |
| --- | --- | --- |
| Tetra-ethyl lead | 5.0 | −15 |
| Tetra-ethyl tin | 1.0 | −3 |
| Diethyl zinc | Less than 0.5 | +1 |
| Dibutyl mercury | 0.5 | +5 |
| Tributyl antimony | 0.5 | +5 |
| Do | 1.0 | +9 |

These data illustrate how heavier metals in Groups II and V have relatively high activities when combined in oil-soluble organo-metallic compounds. An attempt was made to try diethyl mercury, but this compound was somewhat oxidized by atmospheric oxygen, and the product precipitated from the oil. A general tendency of some metal alkyls to gain desired stability under ordinary conditions with increase in the size of the attached alkyl groups has been noted, as in the case of the mercury alkyls. The kind of instability which is desired is that which occurs at higher temperatures, i. e., temperatures at which ignition of fuel in a compression-ignition engine is desired.

In the present invention, the organo-metallic compounds of mercury are true organic mercury compounds which have carbon to mercury linkages, hydrogen and carbon constituents in the organic radical, and an appreciable solubility in hydrocarbon fuels. These include the following types of compounds, having the general formulae: $HgR_2$ or $HgR R'$, in which R represents an alkyl group, and R' an alkyl or aryl group; RHgX, where R is an alkyl group and X is a halide (Cl, Br, or I), or any of the following radicals: dichromate, nitrate, nitroso, carbonyl, sulfate, acetate, sulfur, or hydroxyl. The alkyl group R may be unsaturated. Specific examples of these types of compounds are: di-isopropyl mercury, di-tertiary butyl mercury, di-iso-amyl mercury, di- (normal, secondary, tertiary, or iso) amyl mercury, di-normal heptyl mercury, di-secondary octyl mercury, ethyl hydroxy mercury. From among these types of compounds, the alkyl mercuric nitrates were found to have a relatively high potency as demonstrated by the fact that butyl mercuric nitrate $C_4H_9HgNO_3$ added to the reference fuel in an amount less than 1% produces an ignition lag shortening equivalent to a cetane number increase of +8.

Other general and miscellaneous organo-mercury compounds which come into consideration are: mercarbides, mercury derivatives of aliphatic alcohols, ketones, acids, and esters, mercury derivatives of aromatics, aromatic sulfonates, amines, heterocyclic compounds such as pyridine, thiophene, etc., mercury acetylides and xanthates.

Similarly, the various types of organic compounds of antimony are indicated: $R_4SbX$ and $R_3SbX_2$ (X being a halide, sulfur, selenium, oxygen, etc., singly or mixed, or a radical, e. g., nitrate, hydroxide, etc., and R being a hydrocarbon group such as an iso, normal, secondary or tertiary alkyl group, individually or mixed, or, in part representing aryl groups; quaternary stibonium compounds such as $R_3SbX_2$, aromatic stibines or stibinic acids and their derivatives, and antimonyl derivatives.

Results of engine tests on several organo-metallic compounds of antimony, added in small amounts to a 38 cetane No. gas oil, are given in the following table:

| Organo-metallic compound | Percent of organo-metallic compound in in fuel | Cetane No. increase |
|---|---|---|
| Tributyl methyl stibonium hydroxide | Less than 1.0 | 6 |
| Tributyl methyl stibonium chloroacetate. | Less than 1.0 | 4 |
| Do | 0.1 | 3 |
| Tributyl methyl stibonium iodide | 0.1 | 2 |
| Tributyl methyl stibonium nitrate | Less than 0.75 | 2 |

The bismuth and arsenic compounds which are analogues of the mentioned antimony compounds may also be used, for example, the alkyl bismuthines, quaternary bisonium compounds, and so forth.

The proportion of organo-metallic compound to be added to fuel for improving the ignition qualities of the fuel may range from a fraction of one per cent up to the limit of solubility in the fuel, but preferably the compound is added in amounts ranging from about 0.5 to 5% of the blend.

This invention makes commercially feasible the preparation of Diesel fuels which give satisfactory performance in compression-ignition engines from crude oils, gas oils, and residual oils having low pour points, low A. P. I. gravities, and high heat values, e. g., those procured from naphthene, asphalt base, and mixed base crudes, since the addition in small quantities of the effective organo-metallic compounds of active metals to such fuels sufficiently improves their ignition qualities. The burning qualities of gas oils from paraffin crudes are also enhanced by small additions of these compounds. In general, the hydrocarbon fuels with which these compounds are blended for use in high speed Diesel type engines have boiling ranges above that of gasoline and below those of motor lubricants. Fuels for high speed Diesel engines preferably have viscosities in the range of 30 to 100 Saybolt Universal seconds at 100° F., which is much lower than the range for the lightest oils normally used in motor lubrication.

Small quantities of the effective ignition accelerating organo-metallic compounds may be used for adapting various mixtures of hydrocarbons for use in high speed Diesel engines, such mixtures including recycle reflux from a cracking operation, oils from destructive distillations of pyrobituminous and asphaltic materials, non-paraffinic extracts, and mixtures of these with one another or with crude petroleum fractions. Other agents for enhancing various qualities of the fuels without detracting substantially from ignition qualities, may be admixed with the fuels in addition to the effective organo-metallic compounds; notably, solubilizing agents, dyes, oiliness agents, sludge dispersers, corrosion inhibitors, gum solvents, anti-oxidants, viscosity improvers, and pour point depressants. Substances which aid in exhausting combustion residues and other organic ignition accelerators, such as alkyl nitrites, alkyl nitrates, and alkyl halides, may also be added.

It is not intended that this invention be limited to the specific examples which are given merely for the sake of illustration. It is intended to claim all the novelty inherent in the invention as broadly as the prior art permits in the appended claims.

We claim:

1. The method of operating compression ignition engines of the high speed Diesel type which comprises injecting into the combustion zone of the engine a hydrocarbon Diesel fuel and shortening the ignition lag of said fuel by having present therewith an organo-metallic compound containing a metallic constituent selected from the class consisting of mercury and antimony directly linked to carbon atoms in alkyl radicals, said organo-metallic compound being present in an amount sufficient to decrease the ignition lag of the fuel.

2. The method of operating compression-ignition engines of the high speed Diesel type which comprises injecting into the combustion zone of the engine a hydrocarbon Diesel fuel and shortening the ignition lag of said fuel by having present therewith an organo-metallic compound containing a metallic constituent consisting of antimony directly linked to carbon atoms in alkyl radicals, said organo-metallic compound being present in an amount sufficient to decrease the ignition lag of the fuel.

3. The method of operating compression-ignition engines of the high speed Diesel type which comprises injecting into the combustion zone of the engine a hydrocarbon Diesel fuel and shortening the ignition lag of said fuel by having present therewith an organo-metallic compound containing a metallic constituent consisting of mercury directly linked to carbon atoms in alkyl radicals, said organo metallic compound being present in an amount sufficient to decrease the ignition lag of the fuel.

PHARIS MILLER.
GOULD H. CLOUD.